J. SPAETH & A. TOKARSKI.
TROLLEY WHEEL.
APPLICATION FILED SEPT. 13, 1910.
1,003,380.
Patented Sept. 12, 1911.
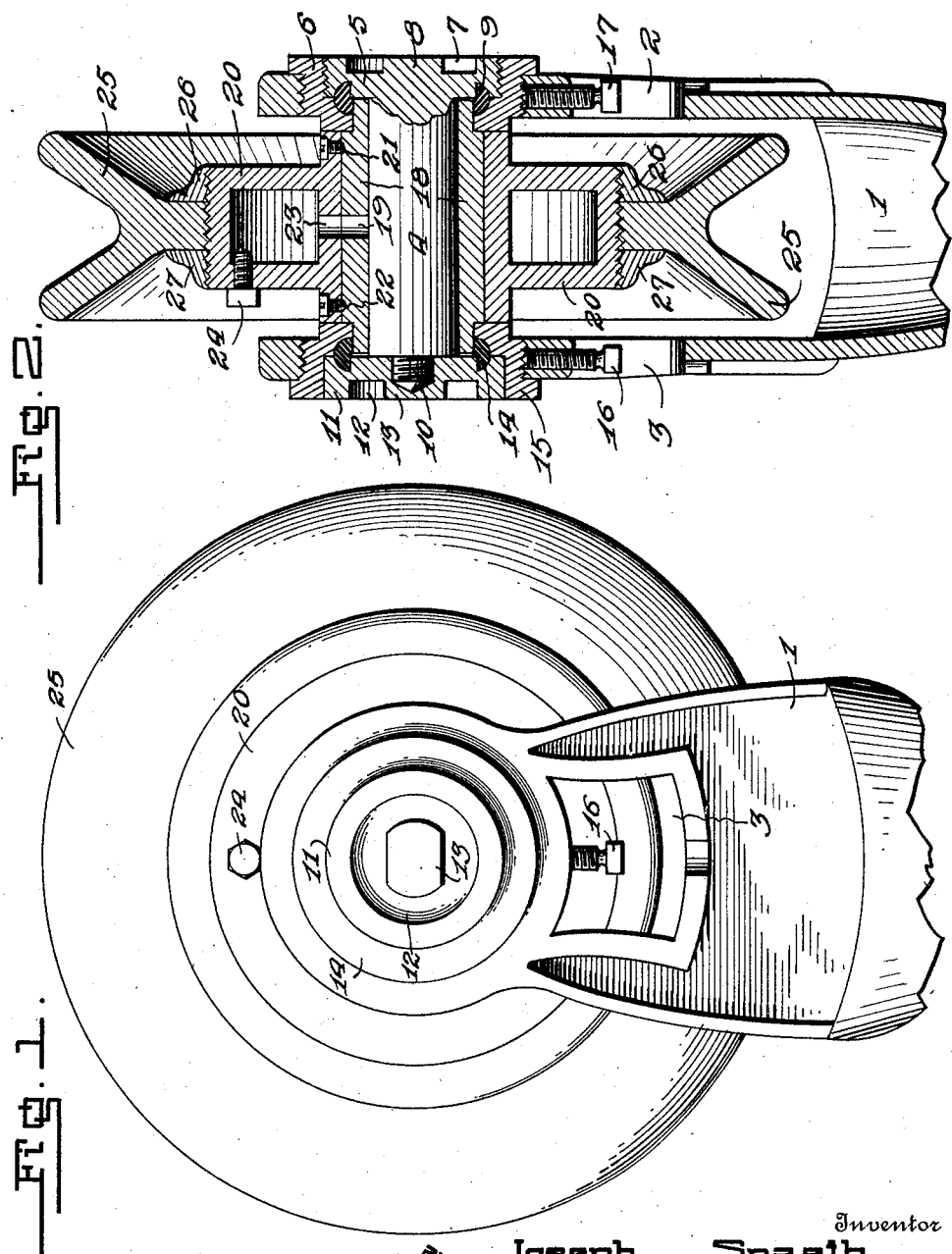
Witnesses
Inventor
Joseph Spaeth
and August Tokarski

UNITED STATES PATENT OFFICE.

JOSEPH SPAETH AND AUGUST TOKARSKI, OF PORT HURON, MICHIGAN.

TROLLEY-WHEEL.

1,003,380.  Specification of Letters Patent.  Patented Sept. 12, 1911.

Application filed September 13, 1910. Serial No. 581,744.

*To all whom it may concern:*

Be it known that we, JOSEPH SPAETH and AUGUST TOKARSKI, citizens of the United States, residing at Port Huron, in the county of St. Clair and State of Michigan, have invented certain new and useful Improvements in Trolley-Wheels, of which the following is a specification, reference being had therein to the accompanying drawing.

This invention relates to trolley wheels and the principal object of the same is to provide means whereby oil can be automatically fed to the axle as it is used.

This invention is illustrated in the accompanying drawings, wherein—

Figure 1 is a side elevation of the improved wheel. Fig. 2 is a vertical sectional view through the wheel, showing the manner of mounting the same within the harp.

Referring to the accompanying drawings by numerals, 1 indicates the harp which is of the usual type, having two arms provided with the alined openings provided with threaded walls. The arms are each provided with an additional opening represented by 2 and 3 which are located adjacent the threaded opening, the object of which will be brought out hereinafter.

An axle 4 is provided with an enlarged threaded head 5 which fits within a socket-piece 6 mounted within one of the threaded openings of the harp. The head 5 is provided with a groove 7, forming a central head 8 adapted to be engaged by a wrench to secure the axle within the socket. The inner surfaces of the socket and head are provided with grooves which when brought together form a seat for the reception of a packing 9. The other end of the axle is provided with a reduced threaded portion 10 which enters an aperture formed in a second head 11 which is constructed similar to the head 5, being provided with a groove 12 and head 13, similar to the portions 7 and 8, and upon the inner surface is formed a seat for the reception of the packing 14. The head 11 is mounted within a socket-piece 15 and the socket-pieces 6 and 15 can be adjusted to the width desired by means of turning them in the threaded opening, and are then to be secured into place by means of the set-screws 16 and 17 which project out into the openings 2 and 3.

A bushing 18 is mounted upon the axle 4 and is provided at each end with reduced portions which enter between the axle and the socket-piece and coming in contact with the packing and holding the same in place. The reduced portions form a shoulder at each end which limits the amount of transverse movement which the bushing has upon the axle. The bushing is provided midway its length with an aperture 19 to permit oil to be fed to the axle. A hollow oil reservoir 20 is rigidly but detachably mounted upon the bushing by means of the screws 21 and 22 and is provided with an opening 23 by means of which oil can be fed upon the bushing and through the opening 19 to the axle. Oil is supplied to the reservoir by means of an opening formed in the side wheel and which is closed by means of the screw 24. The trolley wheel 25 is threaded upon the reservoir and held in place by means of the threaded bands 26 and 27.

From the foregoing it will be seen that this device will be cheap to make since every part of the wheel can be turned on a lathe, and that one part can be removed when worn out and replaced without the necessity of throwing away the entire wheel.

What we claim as our invention is:—

1. A device of the character described comprising a support, a pair of socket-pieces mounted in said support, an axle, said axle being provided with an enlarged head mounted in one of said socket-pieces, a head mounted upon the other end of said axle within the other of said socket pieces, the inner surface of said socket piece and first mentioned head and said socket piece and the second mentioned head being provided with grooves forming seats supporting a packing, a bushing mounted upon said axle, said bushing being provided at each end with a reduced portion entering between said axle and said socket-piece and contacting with said packing, and a wheel mounted upon said bushing.

2. An axle, a head formed upon one end of said axle, said head being provided with an annular groove formed in its inner face, a second head removably secured upon the opposite end of said axle and being also provided with an annular groove in its inner face, a bushing mounted upon said axle, a socket piece mounted upon each end of said bushing, and provided with grooves registering with the grooves formed in said heads, packing mounted in said grooves, a wheel mounted upon said bushing, and a support for said wheel.

In testimony whereof we hereunto affix our signatures in presence of two witnesses.

JOSEPH SPAETH.
AUGUST TOKARSKI.

Witnesses:
W<small>M</small>. B. J<small>AMES</small>,
W<small>M</small>. J. D<small>UFF</small>.